United States Patent
Van Den Schrieck et al.

(10) Patent No.: US 8,951,593 B2
(45) Date of Patent: Feb. 10, 2015

(54) OILSEED CRUSHING HEAT RECOVERY PROCESS

(75) Inventors: Vincent Van Den Schrieck, Sint-Pieters-Leeuw (BE); Etienne Le Clef, Wezembeek-Oppem (BE)

(73) Assignee: N.V. Desmet Ballestra Engineering S.A., Zaventem (BE)

( * ) Notice: Subject to any disclaimer, the term of this patent is extended or adjusted under 35 U.S.C. 154(b) by 0 days.

(21) Appl. No.: 14/239,202

(22) PCT Filed: Aug. 9, 2012

(86) PCT No.: PCT/EP2012/065604
§ 371 (c)(1),
(2), (4) Date: Feb. 17, 2014

(87) PCT Pub. No.: WO2013/023991
PCT Pub. Date: Feb. 21, 2013

(65) Prior Publication Data
US 2014/0186504 A1    Jul. 3, 2014

Related U.S. Application Data

(60) Provisional application No. 61/524,799, filed on Aug. 18, 2011.

(51) Int. Cl.
*A23D 9/04* (2006.01)
*C11B 1/04* (2006.01)
(Continued)

(52) U.S. Cl.
CPC ... *A23D 9/04* (2013.01); *C11B 1/04* (2013.01); *C11B 1/08* (2013.01); *C11B 1/10* (2013.01)
USPC ............ 426/417; 426/455; 426/457; 426/461

(58) Field of Classification Search
CPC ............. C11B 1/00; C11B 1/02; C11B 1/06; C11B 1/08; C11B 1/10; C11B 1/102; C11B 1/108; C11B 3/006; A23J 1/14; A23J 1/142; A23J 1/144; B02B 1/02; B02B 1/04
USPC .................................. 426/417, 455, 457, 461
See application file for complete search history.

(56) References Cited

U.S. PATENT DOCUMENTS 3,833,628 A * 9/1974 Pike et al. ................... 554/11
4,298,540 A * 11/1981 Youn et al. .................. 554/13
(Continued)

FOREIGN PATENT DOCUMENTS

EP          2062963    *  5/2009
WO       WO98/01518    *  1/1998

OTHER PUBLICATIONS

English Translation for EP2062963 published May 2009.*
(Continued)

*Primary Examiner* — Anthony Weier
(74) *Attorney, Agent, or Firm* — Wegman, Hessler & Vanderburg

(57) ABSTRACT

An oilseed crushing process wherein the oilseeds are preheated to generate warm, soft oilseeds, then flakes are generated by flaking the warm, soft oilseeds. The flakes are then cooked by generating a hot vapor stream and hot flakes. The hot flakes are then prepressed to generate oil and a partially de-oiled cake. The partially de-oiled cake is solvent extracted to generate solvent laden oil and solvent laden meal. The hot, wet meal is then dried to generate oilseed meal and an additional hot vapor stream. The at least part of the preheating step to generate warm, soft oilseeds is accomplished using a hot liquid medium. The hot liquid medium is heated by a heat transfer mechanism that condenses at least one of the hot vapor streams generated during the flake-cooking step or the meal-drying step.

13 Claims, 1 Drawing Sheet

(51) Int. Cl.
*C11B 1/08* (2006.01)
*C11B 1/10* (2006.01)

(56) References Cited

U.S. PATENT DOCUMENTS

| | | | | |
|---|---|---|---|---|
| 4,456,556 | A | * | 6/1984 | Grimsby .................. 554/13 |
| 4,457,869 | A | * | 7/1984 | Grimsby .................. 554/21 |
| 4,515,726 | A | * | 5/1985 | Sullivan .................. 554/13 |
| 4,523,388 | A | | 6/1985 | Cuel |
| 6,103,918 | A | * | 8/2000 | Dahlen .................. 554/204 |
| 6,955,831 | B2 | * | 10/2005 | Higgs et al. .................. 426/630 |
| 2006/0051489 | A1 | * | 3/2006 | Higgs et al. .................. 426/630 |

OTHER PUBLICATIONS

International Search Report and Written Opinion mailed Jan. 31, 2013 for PCT/EP2012/065604 filed Aug. 9, 2012.
International Preliminary Report on Patentability mailed Feb. 18, 2014 for PCT/EP2012/065604 filed Aug. 9, 2012.
Schumacher, Heinz, "Preparation of Soybeans Prior to Solvent Extraction", Proceedings of the World Congress on Vegetable Protein Utilization in Human Foods and Animal Feedstuffs, Champaign, Illinois, Oct. 26, 1989, pp. 37-40.

* cited by examiner

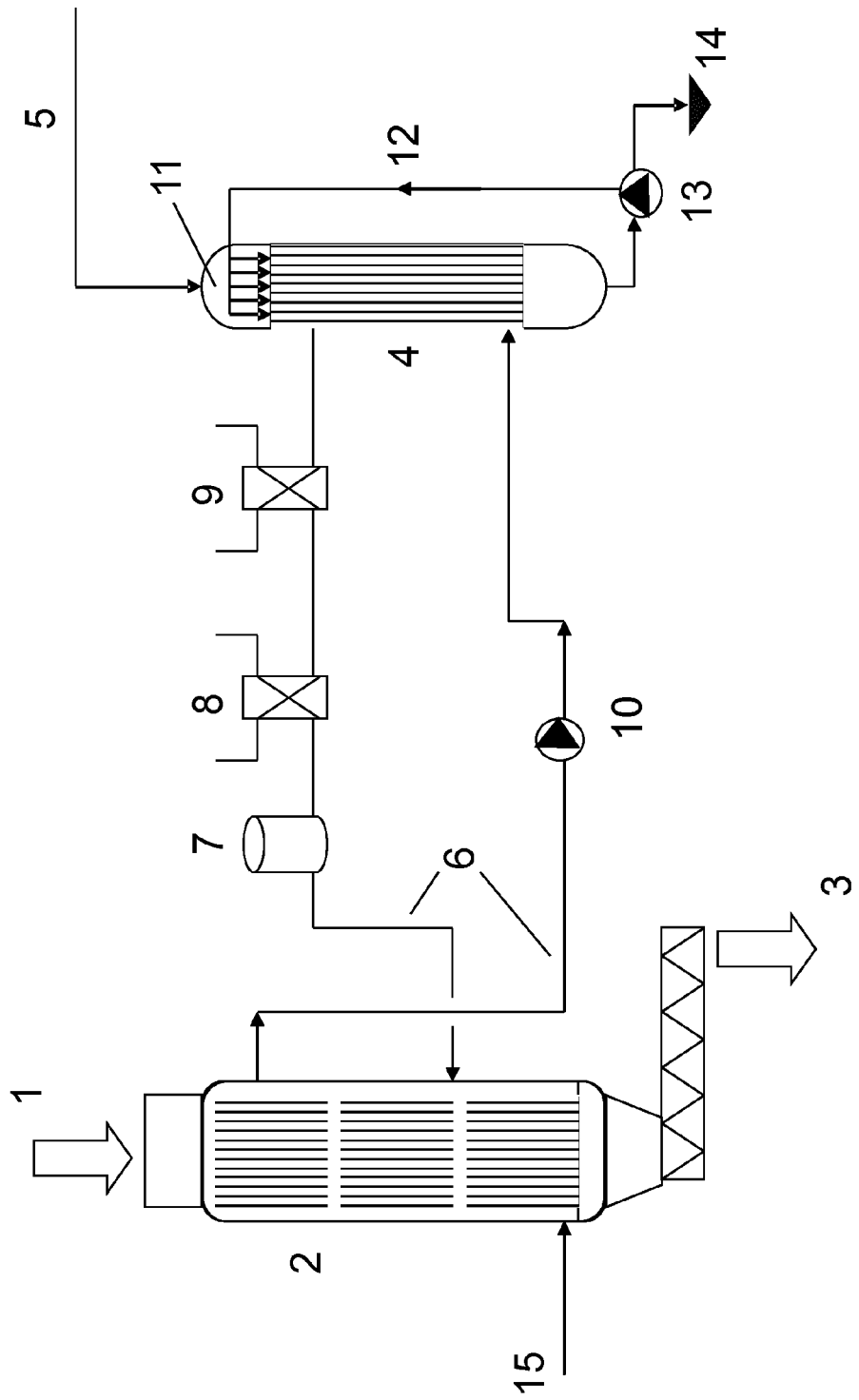

OILSEED CRUSHING HEAT RECOVERY PROCESS

CROSS-REFERENCE TO RELATED APPLICATIONS

This application claims the priority benefit of International PCT Application No. PCT/EP2012/065604 filed Aug. 9, 2012 and U.S. Provisional Patent Application Ser. No. 61/524,799 filed Aug. 18, 2011.

FIELD OF THE INVENTION

The invention relates to an oilseed crushing process improvement, characterized by gaining substantial energy reduction with improved reliability compared to established practice.

BACKGROUND OF THE INVENTION

Oil extraction of oilseeds such as rapeseeds or sunflower seeds is an energy intensive process as it involves several steps requiring mechanical and thermal energy. This energy is partially mechanical, e.g., breaking, grinding, rolling pressing and pelletizing, and partially thermal to degrade cell walls, reduce oil viscosity and adjust moisture content of any intermediate or final product of the process. Before oil extraction proper, the oilseeds must be prepared: energy must be used to rupture or weaken the walls of the oil-containing cells. For some seeds, for example sunflower, a dehulling is also recommended.

The oilseed crushing process will be described in more detail for rapeseed which is one of the major oilseeds with a worldwide production exceeding 62 million tons in 2009 and steadily increasing. The oilseed crushing process is broken down in several steps: cleaning, preheating, flaking, cooking, prepressing and solvent extraction. During the cleaning step, dust, oversized and foreign particles are removed from the oilseeds. During the preheating step, the seeds are preheated from ambient temperature to about 50-70° C. by indirect heating or direct hot air contact. This preheating weakens the cell structure and softens the rapeseed which improves subsequent flaking. During the flaking step, the preheated rapeseeds are flaked between steel rolls with the aim to reduce the thickness which in the downstream solvent extraction step allows the solvent, usually hexane, to penetrate into the cellular structure to dissolve and extract the oil. Before solvent extraction, the flakes must be cooked, typically in a stacked vertical steam-tray cooker or in a horizontal rotary steam-tube cooker to about 80-100° C. In this cooking step the flakes are not only heated but the moisture content is reduced from about 8-10% to about 4-6%. Therefore, the cooking of the flakes generates a hot vapour stream. This vapour stream is contaminated by fatty material, fine particles of seed (fines) and often odoriferous components. The flakes are finally prepressed and solvent extracted to yield rapeseed oil and rapeseed meal that both need further processing. Typically, the oil is refined by several successive steps, and the meal is desolventised. After desolventisation, the rapeseed meal is then dried in specific equipment such as for example a vertical stacked fluidized air tray dryer or a horizontal rotary steam-tube dryer. The meal dryer typically reduces the meal from approximately 14-18% moisture to 10-12% moisture. Therefore, a second hot vapour stream, usually contaminated by fine meal particles (fines) and often odoriferous components is emitted from the meal drying step.

Accordingly, as illustrated above, the oilseed crushing process is energy intensive with a substantial thermal heating step and two substantial thermal drying steps, creating the potential for energy savings.

An efficient energy recovery solution is described in EU-project LIFE04 env/d/000051. In this energy recovery process, the thermal energy contained in the hot vapours leaving the flake cooking step is valorised to preheat the rapeseed in the seed preheating step. This recovery process involves the scrubbing of the exhaust hot vapours leaving the flake cooking step to generate hot water which is then used to preheat the rapeseed entering the crushing process through the use of a preheater comprised of vertical heat exchanger plates. The rapeseeds are flowing between the plates by gravity and are preheated by conductivity. This process is indeed efficient to recover thermal energy contained in the hot vapours leaving the flake cooking step; however, the scrubbing of those hot vapours generates hot water contaminated by fatty material and fines. Therefore, the cleaning and the maintenance of the equipment in contact with the hot water contaminated by fatty material and fines are difficult. Alternatively, the hot vapours stream(s) could be cleaned by filter media or cyclonic separation but those methods are inefficient since they lead to a rapid clogging of the cleaning means due to the sticky nature of the contaminants created by the protein contained in the fines.

It is therefore the aim of the present invention to describe a process to recover thermal energy contained in the hot vapour stream(s) contaminated by fatty material and/or fines and/or odoriferous components leaving the flake cooking step or the meal drying step of an oilseed crushing process, with such process incurring minimum fouling of heat transfer mechanisms to maintain continuous high efficiency with minimum cleaning or maintenance.

SUMMARY OF THE INVENTION

It has been found that substantial thermal energy recovery can be achieved for an oilseed crushing process including the following steps. The present invention therefore provides an oilseed crushing process which comprises any one or more of the following steps a) to g):

a) preheating the oilseeds to generate warm, soft seeds,
b) flaking the warm, soft oilseeds to generate flakes,
c) cooking the flakes, said cooking generating a first hot vapour stream and hot flakes,
d) prepressing the hot flakes to generate oil and a partially de-oiled cake,
e) solvent extracting the partially de-oiled cake to generate solvent laden oil and solvent laden meal,
f) desolventizing the solvent laden meal to generate hot, wet meal,
g) drying the hot, wet meal to generate oilseed meal and a second hot vapour stream, wherein at least a part of the preheating of the oilseeds in step (a) may be realised in a preheating mechanism using a hot liquid medium, with said hot liquid medium optionally being heated by a heat transfer mechanism condensing at least one of said hot vapour streams from step (c) or (g) to generate said hot liquid medium.

It has surprisingly been found that the use of a novel tubular condenser as said heat transfer mechanism to condense the hot vapour leaving the flake cooking step and/or the meal drying step of an oilseed crushing process allows substantial recovery of the thermal energy of said hot vapour streams without generating a problematic fouling of the heat transfer mechanism when the hot vapour contaminated with oil and/or fines and/or odoriferous components is condensed inside the tubes of said tubular condenser. Furthermore, cleaning of said tubular condenser is simple and continuous. Further benefits and advantages of the invention will become apparent in the detailed description of the invention.

BRIEF DESCRIPTION OF THE DRAWINGS

FIG. 1 is a representation of one embodiment of the process according to our invention.

DETAILED DESCRIPTION

The invention will be described as applied for the processing of rapeseed, however, this invention is not limited to this particular type of oilseed. Any oilseed requiring a crushing process involving an oilseed preheating step and a flake cooking step and/or a meal drying step will benefit from this invention. The process according to the invention preferably makes use of a preheating apparatus (preheater) where the rapeseeds are preheated by conductivity while being in contact with heated vertical plates. In such preheater, a hot liquid medium (for example hot water) is used instead of steam to preheat the rapeseed. The hot liquid medium is flowing counter current to the product flow, through a bank of vertically erected hollow, stainless steel plates (such plates are commonly referred as pillow plates). The rapeseeds flow slowly downward by gravity between the plates, in mass flow and are thereby preheated up to a uniform temperature. Below the plates bank, a discharge mechanism controls the downward flowrate of the heated material, in this case the preheated rapeseed through the preheater. During this process the hot liquid medium circulating in a closed loop is cooled and needs to be subsequently reheated. Preheaters of such design are manufactured for example by Solex Thermal Science Inc., (Calgary, Alberta, Canada). However, the invention is not limited to this particular supplier. Any preheater using hot liquid medium circulating in hollow cavities of any form or size distributed in the mass of oilseed could benefit from the present invention. The hot liquid medium is commonly water but the present invention is not limited to this particular liquid heating medium.

According to an embodiment of the present invention, hot water of about 60 to 85° C. used as the heating liquid medium in the seed preheating mechanism (preheater) is produced in at least one tubular condenser condensing hot vapour produced during the flake cooking process and/or the meal drying process. The hot vapour condenses inside the tubes of the condenser, and the water circulates in the shell side of the condenser where the water is heated and conducted to the preheater in a closed loop. Preferably, a part of the condensate accumulating inside the tubes at the bottom of the tubular condenser is recycled at the top of the tubes via adequate pump and piping. The recycled condensate takes the incoming vapour stream to its dew point upon entry to maximize heat transfer, and the water runs down the internal surface of the tubes. It has also been observed that the recycled condensate has an unexpected cleaning effect by continuously removing entrained oil and/or fines. The portion of the condensate not recycled back to the top of the tubes is drained and discarded. Typically, about 40 to 80% of the condensate is recycled to the top of the tubes, with the remaining condensate being drained; however, the invention is not limited to this particular recycling percentage range. The recycling rate must be high enough to ensure that top of the tubes are not dry in order to avoid fouling inside the tubes of the tubular condenser. However, excessive recycling rate of the condensate is to be prevented to avoid unacceptable cooling of the water exiting the tubular condenser. For a large oilseed crushing installation processing 2000 tons of rapeseed per day, a tubular condenser equipped with about 500 to 1000 vertical tubes of a length of about 5000 to 11000 mm and of diameter of about 20 to 50 mm is adequate to operate the process, according to the invention. Preferably, the tubes are made of stainless steel. The shell of the tubular condenser is preferably equipped of baffles to increase the water velocity and improve the heat exchange coefficient between the tubes and the shell. Preferably, the hot vapours are introduced on the top of the tubular condenser by fan or other means capable of providing sufficient velocity to the hot vapours to induce an additional self-cleaning effect by inhibiting the build-up of oil and/or fines fouling the inside of the tubes. Preferably, the hot vapour velocity is about 10 to 30 m/sec entering the tubes.

According to an embodiment of the present invention hot vapours produced during the meal drying process can also be condensed in a similar tubular condenser to produce hot water of about 60 to 85° C. Preferably, it is more efficient to dedicate one tubular condenser for each particular process producing a hot vapour stream. Indeed, particular hot vapour temperature, concentration and contamination type demand a tailored tubular condenser adapted to the precise characteristics of the hot vapour stream to be condensed. Alternatively, separate hot vapour streams could be combined and condensed in one tubular condenser.

The oilseeds in the lower portion of the seed preheating mechanism may be finish heated by hot water and/or steam produced by a conventional boiler in addition to the hot water produced by the tubular condenser used in the upper portion of the seed preheating mechanism, especially during winter when incoming oilseed temperatures are lower.

Optionally, the hot water leaving the tubular condenser is further heated by circulating in one or more heat exchangers processing any hot fluids produced in any step of the crushing process. Such hot fluids are for example hot oil produced during the prepress step or hot condensate produced during in the flake cooking step. Typically the one or more heat exchangers are fitted in line on the piping carrying the hot water produced by the tubular condenser to the preheater.

Such tubular condenser does not require frequent production downtime for cleaning, and if such cleaning is required, it can be reduced in time due to the large diameter of the tubes which can be cleaned by conventional high pressure cleaning equipment. The cleaning frequency depends on various factors such as the oilseeds origin and possible contamination by foreign material. The reduction of the cleaning frequency is an important advantage of the process according to the present invention since such cleaning involves production downtime.

The savings of the process, according to the present invention, are substantial despite the significant cost of the required tubular condenser. As an example, for an installation processing 2000 tons per day of rapeseed, the recovered energy in one tubular condenser condensing the hot vapour stream generated by the cooking of the flakes alone avoids the consumption of 20 to 30 kg of steam per ton of processed rapeseed. At current heating oil value, this steam cutback translates into savings of 300,000 to 450,000 Euros per year.

A side benefit is that a part of the odoriferous components usually present in the hot vapour stream(s) originating from the cooker or the meal dryer are condensed in the process according to the present invention and are therefore not released in the atmosphere which may lead to a reduction of the odour emitted by oilseed crushing installations, particularly rapeseed crushing facilities. However, as the detection threshold limit of those odoriferous components is very low, the reduction of the perceived odour is sometimes much less important than the actual reduction of the quantity of odoriferous components released to the atmosphere.

FIG. 1 is a diagram of the process according to our invention. The rapeseeds stored at ambient temperature for example in storage silos (not shown) are introduced at the top of the preheater (1). The rapeseeds are preheated by moving slowly between hollow vertical plates (2). The preheated rapeseeds (3) exit the preheater to be further processed (flaking, cooking, prepressing, solvent extraction, desolventisation of the meal, drying of the meal). At least a part of the hot water is produced in the tubular condenser (4) by condensing the hot vapour (5) originating from the cooker or other equipment generating hot vapour such as, for example, the meal dryer (not shown). At least part of the condensate produced by the tubular condenser is recycled inside the tubes (11) of said tubular condenser via adequate piping (12) and circulating pump (13). The non-recycled fraction is drained and further processed (14). The hot water is conducted to the preheater by adequate piping (6) including proper equipment such as expansion vessel (7) and optionally additional heat exchanger(s) (8, 9) to further heat the hot water, and circulating pump (10). The additional heat exchanger(s) can process hot fluids produced in other step(s) of the oilseed crushing process such as hot oil for example (not shown) or hot condensate from the flake cooker or any other hot fluid. Optionally, steam or hot water (15) produced by conventional means (not shown) can serve as additional downstream heating medium for the preheater.

The invention claimed is:

1. An oilseed crushing process including the steps of:
   a) preheating the oilseeds to generate warm, soft oilseeds,
   b) flaking the warm, soft oilseeds to generate flakes,
   c) cooking the flakes, said cooking generating a first hot vapour stream and hot flakes,
   d) prepressing the hot flakes to generate oil and a partially de-oiled cake,
   e) solvent extracting the partially de-oiled cake to generate solvent laden oil and solvent laden meal,
   f) desolventizing the solvent laden meal to generate hot, wet meal,
   g) drying the hot, wet meal to generate oilseed meal and a second hot vapour stream, characterised in that at least a part the preheating of the oilseeds in step (a) is realised in a preheating mechanism using a hot liquid medium having a temperature of about 60- about 85° C., with said hot liquid medium being heated by a heat transfer mechanism forming a condensate from hot vapour from at least one of said hot vapour streams from step (c) or (g) to generate said hot liquid medium wherein said hot liquid medium is water.

2. The process according to claim 1 wherein said heat transfer mechanism comprises a tubular condenser, said tubular condenser being erected vertically.

3. The process according to claim 2 in which said tubular condenser comprises a plurality of tubes said hot vapour being condensed in said tubes.

4. The process according to claim 3 in which said hot vapour is introduced at the top of said tubes.

5. The process according to claim 4 in which the velocity of said hot vapour inside said tubes is at least 10 m/sec.

6. The process according to claim 3 in which at least a fraction of said condensate is recycled inside said tubes.

7. The process according to claim 6 in which said recycled condensate is introduced at the top of said tubes.

8. The process according to claim 1 in which the hot liquid medium is further heated by one or more heat exchangers.

9. The process according to claim 1 in which the oilseed is rapeseed.

10. The process according to claim 1 wherein said preheating mechanism comprises a plurality of cavities wherein said hot liquid medium flows through said cavities to heat said oilseeds via conductivity.

11. The process according to claim 10 wherein said cavities comprise hollow plates.

12. The process according to claim 10 further comprising recycling said hot liquid medium from said cavities to said heat transfer mechanism.

13. The process according to claim 12 wherein said heat transfer mechanism comprises a tubular condenser.

\* \* \* \* \*